United States Patent

Sato et al.

[19]

[11] Patent Number: 4,697,882

[45] Date of Patent: Oct. 6, 1987

[54] BEAM SPLITTER FOR CHANGING OPTICAL PATHS SMALL TILT

[75] Inventors: Yasuhisa Sato, Kanagawa; Yasuyuki Yamada, Tokyo; Hiroki Nakayama; Kouji Oizumi, both of Kanagawa, all of Japan

[73] Assignee: Canon Kabushiki Kaisha

[21] Appl. No.: 772,769

[22] Filed: Sep. 5, 1985

[30] Foreign Application Priority Data

Sep. 6, 1984 [JP] Japan .................................. 59-186673

[51] Int. Cl.$^4$ ...................... G02B 7/18; G02B 23/04; G02B 26/08
[52] U.S. Cl. ................................. 350/287; 350/286; 350/486; 350/445; 350/453
[58] Field of Search ............... 350/287, 286, 484, 486, 350/445, 446, 541, 557, 569, 485, 453; 372/16

[56] References Cited

U.S. PATENT DOCUMENTS

| | | | |
|---|---|---|---|
| 3,351,767 | 11/1967 | Suiter ................................. | 350/484 |
| 3,515,464 | 6/1970 | Peifer et al. ........................ | 350/286 |
| 3,606,544 | 9/1971 | Arndt ................................. | 350/484 |
| 3,940,609 | 2/1976 | Johnstun ............................ | 350/484 |

FOREIGN PATENT DOCUMENTS

| | | | |
|---|---|---|---|
| 286474 | 8/1915 | Fed. Rep. of Germany ...... | 350/287 |
| 827259 | 1/1938 | France ............................... | 350/286 |

Primary Examiner—Jon W. Henry
Attorney, Agent, or Firm—Toren, McGeady & Associates

[57] ABSTRACT

In the disclosed beam splitter, a first prism has an entrance face, an inclined face, and a mirrored face for totally reflecting a beam reflected from the inclined face back to the inclined face. A second prism has an entrance face in parallel with the inclined face of the first prism, and two exit faces. One of the exit faces of the second prism cooperates with the mirrored face of the first prism. When the first and second prisms are turned as a unit, the inclined face of the first prism either passes a light beam arriving from the entrance face through to the second prism and out one of the exit faces or totally reflects the arriving light beam to the mirrored face. The light beam reflected back from the mirrored face now passes through the inclined face to the second prism and out the cooperating exit face of the second prism.

8 Claims, 8 Drawing Figures

BEAM SPLITTER FOR CHANGING OPTICAL PATHS SMALL TILT

BACKGROUND OF THE INVENTION

1. Field of the Invention

This invention relates to optical devices for use in, for example, cameras, telescopes, microscopes and various kinds of optical measuring instruments, and more particularly to beam splitters and optical devices using the same in optical systems of such instruments.

2. Description of the Prior Art

The prior known beam splitters are exemplified in FIGS. 1A to 1C. The beam splitter of FIG. 1A includes a half-reflection mirror HM and is of the split-amplitude type. The entering light beam L1 is split into two parts L2 and L3 at a prescribed ratio. Thus, there is a disadvantage that both exiting beams become darker.

In FIG. 1B, a partial mirror PM is positioned in the path of a portion of the beam L1 to split off a wave front of light. In this case too, both fields of view become darker.

In FIG. 1C, the beam L1 is split by a slidable mirror SM positioned at an angle of inclination to the beam. Since a space must be created for the slidable mirror to occupy when retracted, the use of this beam splitter is disadvantageous when trying to minimize the size of the optical device.

SUMMARY OF THE INVENTION

A first object of the invention is to provide a beam splitter which enables a full amount of light to be supplied to either of two desired directions, while nevertheless necessitating no surplus space.

A second object is to provide a beam splitter constructed with a two prism assembly in which a first prism has an inclined face of either transmittance or total reflection for the entering beam depending on the angle of incidence, and a reflective face for reflecting the reflected beam back toward the inclined face, and a second prism has two exit faces in relation to the entrance and reflective faces of the first prism respectively, whereby when the prism assembly is tilted, the entering beam, after having either passed through the inclined face or been totally reflected therefrom, emerges from the corresponding one of the two exit faces to the desired direction.

A third object is to provide an optical device using such a beam splitter.

DETAILED DESCRIPTION OF THE PREFERRED EMBODIMENTS

Figure 1A:
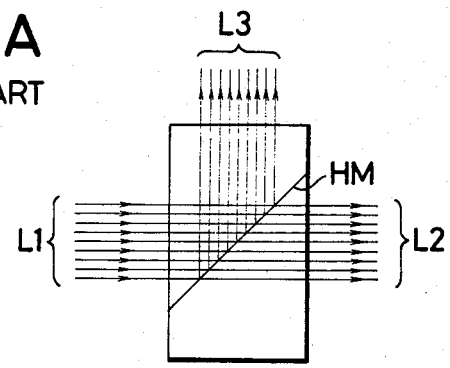
FIGS. 1A to 1C are schematic sectional views of the prior known examples of beam splitters.
Figure 1B:
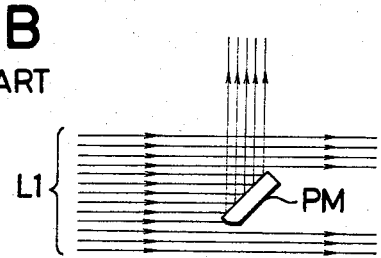
Figure 1C:
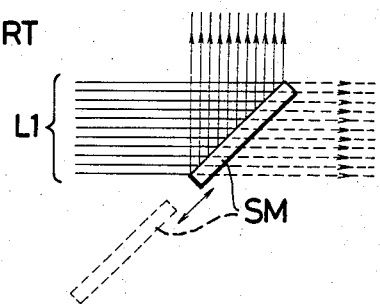

The present invention is next described in connection with a first embodiment thereof by reference to FIGS. 2 and 3 where the entering beam is either transferred horizontally or deflected upward, respectively. First and second prisms 1 and 2 are positioned in minutely spaced relation to each other. The first prism 1 has an entrance face 1a, an inclined face 1b for causing the arriving beam either to transmit therethrough or to totally reflect therefrom, and a mirrored face 1c for reflecting back the beam coming from the inclined face. The second prism 2 has an entrance face 2a substantially parallel to the inclined face 1b of the first prism, a first exit face 2b from which a beam emerges in a horizontal direction, and a second exit face 2c from which another beam emerges obliquely upward. The first and second exit faces 2b and 2c are so oriented that the arriving beams are refracted to respective desired directions.

The first and second prisms 1 and 2 are supported by a mechanism (not shown) to tilt as a unit between two click-stopped angular positions.

Figure 2:
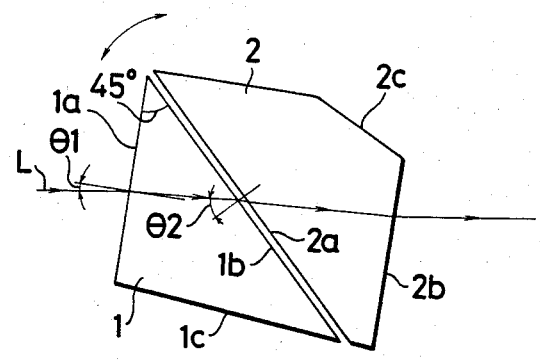
FIGS. 2 and 3 are longitudinal section views of an embodiment of a beam splitter according to the present invention in different operative positions.

In operating such a beam splitter, when in the position of FIG. 2, a principal ray L enters the first prism 1 at the face 1a and refracts to an angle $\theta 1$, travelling to the inclined face 1b. Because the angle of incidence $\theta 2$ on the inclined face 1b is previously determined to be smaller than the critical angle $\phi$ for total reflection, the arriving ray leaves the inclined face 1b refracted and goes to the entrance face 2a of the second prism 2. After having travelled straight to the right, it emerges from the first exit face 2b.

Figure 3:
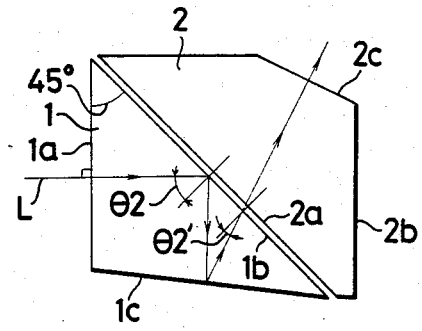

When the first and second prisms 1 and 2 are turned a very small angle in a counterclockwise direction from the position of FIG. 2 to the position of FIG. 3, the angle of incidence of the ray L on the entrance face 1a of the first prism 1 becomes normal thereto. Therefore, the entering ray does not undergo refraction, and travels straight to the inclined face 1b. Since, in this position, the angle of incidence $\theta 2$ takes a larger value than the critical angle $\phi$, the arriving ray is subjected to total reflection downward and then is reflected back from the mirrored face 1c. The ray then meets the inclined face 1b again. Now, however, because the angle of incidence $\theta 2'$ is smaller than the critical angle $\phi$, the ray passes through face 1b, travels through the second prism 2 and emerges from the second exit face 2c to the upper right of the beam splitter.

The angle the beam splitter must turn to change over between the two exiting light-ray axes will now be discussed in detail. Letting $\theta 2$ denote the angle of incidence of the ray on the inclined face 1b, and n the refractive index of the material of the first prism 1, the critical angle $\phi = \sin^{-1}(1/n)$.

For transmission, $\theta 2 < \sin^{-1}(1/n)$, and
for total reflection, $\theta 2 \geq \sin^{-1}(1/n)$
must be satisfied. Taking a practical example, the refractive index of the optical glass of the prism has a value of n=1.55, and the light beam may diverge or converge within limits of ±4°. The vertical angle of the first prism is assumed to be 45°. Then, the critical angle $\phi$ is $\phi = \sin^{-1}(1/1.55) = 40.2$ (degrees). In the angular position of FIG. 3, therefore, all the rays are totally reflected, since $\theta 2 = 45° \pm 4°$, or 41° to 49°.

To allow for transmission of all the rays across the inclined face 1b, the angle of incidence $\theta 2$ must be smaller than 40.2 degrees. When the beam splitter turns from the angular position of FIG. 3 to that of FIG. 2, the angle of incidence must be decreased by 8.8° (=49°−40.2°). By taking into account the angle of refraction $\theta 1$ at the entrance face 1a in the angular position of FIG. 2, there obtains the following simple equation for the required angle of tilt, $\alpha$, of the beam splitter:

$$\alpha = \theta_1 + 8.8° = (n-1)\alpha + 8.8°$$

In the aforesaid practical example, $\alpha \approx 19.6°$. By tilting the beam splitter from the position of FIG. 3 to about 19.6°, it is reduced to $\theta_2 = 36.2° \pm 4°$ (32.2° to 40.2°). Thus, the total reflection is changed to transmission.

It will be appreciated that the axis about which the two prisms turn between the two angular positions is made to lie near or at the center of the area of the cross-section, thereby giving an advantage that there is no need for providing an unduly large surplus space. Also, manageability is improved. Moreover, since the exiting beam is obtained either by passing the entering beam straightforward therethrough, or by reflecting it from the total reflection face and the mirrored face, both optical paths can assure as intense exiting beams as the entering beam.

Figure 4:
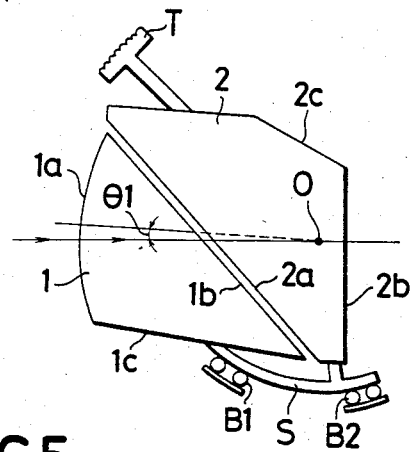
FIGS. 4 and 5 are similar to FIGS. 2 and 3 except that another embodiment of the invention is illustrated.
Figure 5:
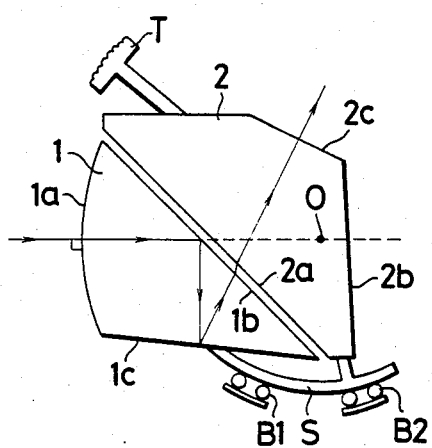

Another embodiment shown in FIGS. 4 and 5 has a feature that the angle of tilt, $\alpha$, of the beam splitter is reduced by forming the entrance face 1a of the first prism 1 in a spherical shape of forward convexity with its center of curvature O coincident with the center of rotation of the beam splitter. The other features of this embodiment are similar to those of the first embodiment. Element S is a support ring having not only the function of fixedly securing the two prisms 1 and 2 to each other, but also of enabling these prisms to rotate as a unit in cooperation with bearings B1 and B2. An actuator or lever T for rotating the support ring S is arranged to be accessible from the outside of a housing (not shown).

Despite the prisms being tilted about the center of curvature O of the spherical entrance face 1a of forward convexity, the angle the ray makes with the entrance face can be maintained constant. That is, $\theta = 0$ always holds, giving $\alpha = 8.8°$. Thus, changing over between the transmission and the total reflection can be carried out by less than half of the angle of rotation of the first embodiment. FIG. 4 shows the position for transmission and FIG. 5 shows the position for total reflection.

The entrance face 1a may alternately be of forward concavity. Even in this case, the beam splitter is turned about the center of the concave entrance face with a similar advantage that the required amount of rotation is markedly reduced.

Figure 6:
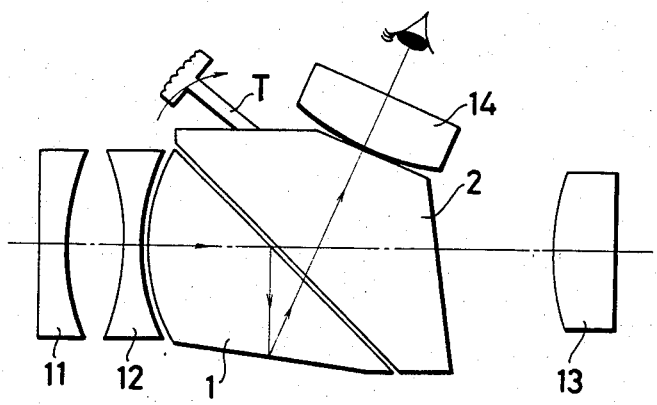
FIG. 6 is a longitudinal section view of a finder employing the beam splitter of FIGS. 4 and 5.

FIG. 6 illustrates an example of application of the beam splitter of FIGS. 4 and 5 to the reverse-Galilean finder. A negative objective lens 11 is followed by a negative intermediate lens 12 whose rear surface conforms to the entrance face of the first prism. A first eyepiece 13 is positioned on the horizontal optical path. A second eyepiece 14 is positioned on the optical path to the upper rear.

A light beam, passing through the objective lens 11 and the intermediate lens 12, enters the first prism 1 and, when in the illustrated operative position, is then totally reflected from the inclined face and further from the mirrored face and then passes through the second prism 2 to the second eyepiece 14 for observing a finder image. Thus, the finder is a waist-level finder.

Next, when the first and second prisms 1 and 2 are turned in a clockwise direction, the entering beam passes through the inclined face and further through the interior of the second prism 2 straightforward, reaching the first eyepiece 13. Thus, the finder becomes an eye-level finder. It should be recognized that a finder capable of changing over between the waist-level and eye-level aspects by tilting the prisms to a prescribed small angle is realized.

Though not shown, many other applications of the beam splitter of the invention are possible. For example, the first prism 1 can be preceded by a convergent objective lens, the second prism 2 axially followed by a convergent image forming lens in front of a photographic film or a video image pickup tube, and a finder optical system positioned in the optical path of total reflection, thus constituting an optical system for a camera.

As has been described above, according to the present invention, the light beam can be changed over between two exiting light axes of desired direction with advantages that a full light amount is supplied to either of the exiting light axes, and no unduly large surplus space is necessary for the purpose of changing over. The use of such a beam splitter in any type of optical instrument makes it possible to improve the optical performance because the entering beam is transferred to the exiting beam without decreasing the light amount. Further, the present invention contributes to a great reduction in size of the optical device employing the beam splitter, because no slidable mirror is used as in the prior art.

What is claimed is:

1. A light beam splitting device comprising a first prism having an entrance face at which a light beam enters, an inclined face for either transmitting or totally reflecting the entering light beam, and a reflecting face for reflecting the light beam after the total reflection from the inclined face, and a second prism having an entrance face confronting the inclined face of the first prism to receive the exiting light beam from the inclined face, and two exit faces from which the light beam transmitted directly through the inclined face and the light beam having been totally reflected from the inclined face selectively emerge, respectively, wherein said light beam splitting device further comprises means for rotating the first and second prisms as a unit so as to selectively transmit or totally reflect the entering light beam through or from the inclined face of the first prism, respectively, causing the exiting light beam to emerge from the selected one of the two exit faces of the second prism.

2. A light beam splitting device according to claim 1, wherein the entrance face of said first prism is substantially curved with a center of curvature thereof coincident with a center of rotation of the first and second prisms.

3. An optical device comprising:
   (a) an objective lens having an optical path;
   (b) first and second rear lens elements; and
   (c) prismatic optical means having a flat face for totally reflecting said optical path and for transmitting said optical path, wherein said prismatic optical means is made rotatable to selectively direct the totally reflected optical path to said first rear lens element and the transmitted optical path to said second rear lens element.

4. An optical device according to claim 3, wherein said prismatic optical means includes a first prism having said flat face and a second prism having a plurality of exit faces, an exiting optical path of the first prism entering said second prism.

5. An optical device according to claim 4, wherein said first prism has a reflecting face for reflecting the totally reflected optical path from said flat face.

6. An optical device according to claim 3, wherein said first and second rear lens elements are respectively eyepiece lenses.

7. An optical device according to claim 3, wherein said prismatic optical means includes an entrance face having a spherical surface whose center of curvature is coincident with the center of rotation of said prismatic optical means.

8. An optical device according to claim 4, wherein a minute space is provided between said first prism and said second prism.

* * * * *